(12) United States Patent
Goyal et al.

(10) Patent No.: US 10,108,691 B2
(45) Date of Patent: Oct. 23, 2018

(54) ATOMIC CLUSTERING OPERATIONS FOR MANAGING A PARTITIONED CLUSTER ONLINE

(71) Applicant: MemSQL, Inc., San Francisco, CA (US)

(72) Inventors: Ankur Goyal, San Francisco, CA (US); Alex Skidanov, San Francisco, CA (US); Adam Prout, San Francisco, CA (US)

(73) Assignee: MemSQL, Inc., San Francisco, CA (US)

( * ) Notice: Subject to any disclaimer, the term of this patent is extended or adjusted under 35 U.S.C. 154(b) by 128 days.

(21) Appl. No.: 15/224,504

(22) Filed: Jul. 29, 2016

(65) Prior Publication Data

US 2017/0091301 A1  Mar. 30, 2017

Related U.S. Application Data

(60) Provisional application No. 62/233,825, filed on Sep. 28, 2015.

(51) Int. Cl.
*G06F 17/30* (2006.01)
(52) U.S. Cl.
CPC .. *G06F 17/30584* (2013.01); *G06F 17/30377* (2013.01)
(58) Field of Classification Search
CPC .............. G06F 17/30377; G06F 17/30584
See application file for complete search history.

(56) References Cited

U.S. PATENT DOCUMENTS

| | | | | |
|---|---|---|---|---|
| 2013/0198139 A1* | 8/2013 | Skidanov | ........... | G06F 17/30289 707/649 |
| 2013/0198166 A1* | 8/2013 | Prout | ................ | G06F 17/30442 707/718 |
| 2013/0198232 A1* | 8/2013 | Shamgunov | ...... | G06F 17/30545 707/770 |
| 2014/0052843 A1* | 2/2014 | Goyal | .................... | H04L 49/70 709/224 |

OTHER PUBLICATIONS

Article entitled "MennSQL Command Reference", by MemSQL, dated Sep. 23, 2014.*

* cited by examiner

*Primary Examiner* — Mahesh H Dwivedi
(74) *Attorney, Agent, or Firm* — EIP US LLP

(57) ABSTRACT

A set of six atomic primitives are provided for a database management system that may be used in combination to provide all of the common features and functions of a clustered database, including data failover, auto-healing, and elastic scaling. These six atomic primitives include CREATE, DROP, DETACH, ATTACH, COPY, and PROMOTE. Of particular note, it is shown that by maintaining appropriate metadata, including the status of each instance of each partition in the cluster, the versatility and reliability of this set of primitives is sufficient to implement each of the aforementioned data failover, auto-healing, and elastic scaling functions with high efficiency using a minimal number of these primitives. Each primitive is atomic (such that the cluster clearly in one state or another) and online (a workload of reads and writes is uninterrupted while the primitive runs), and each primitive is scoped to a single partition of data, thereby enabling parallel processing.

17 Claims, 5 Drawing Sheets

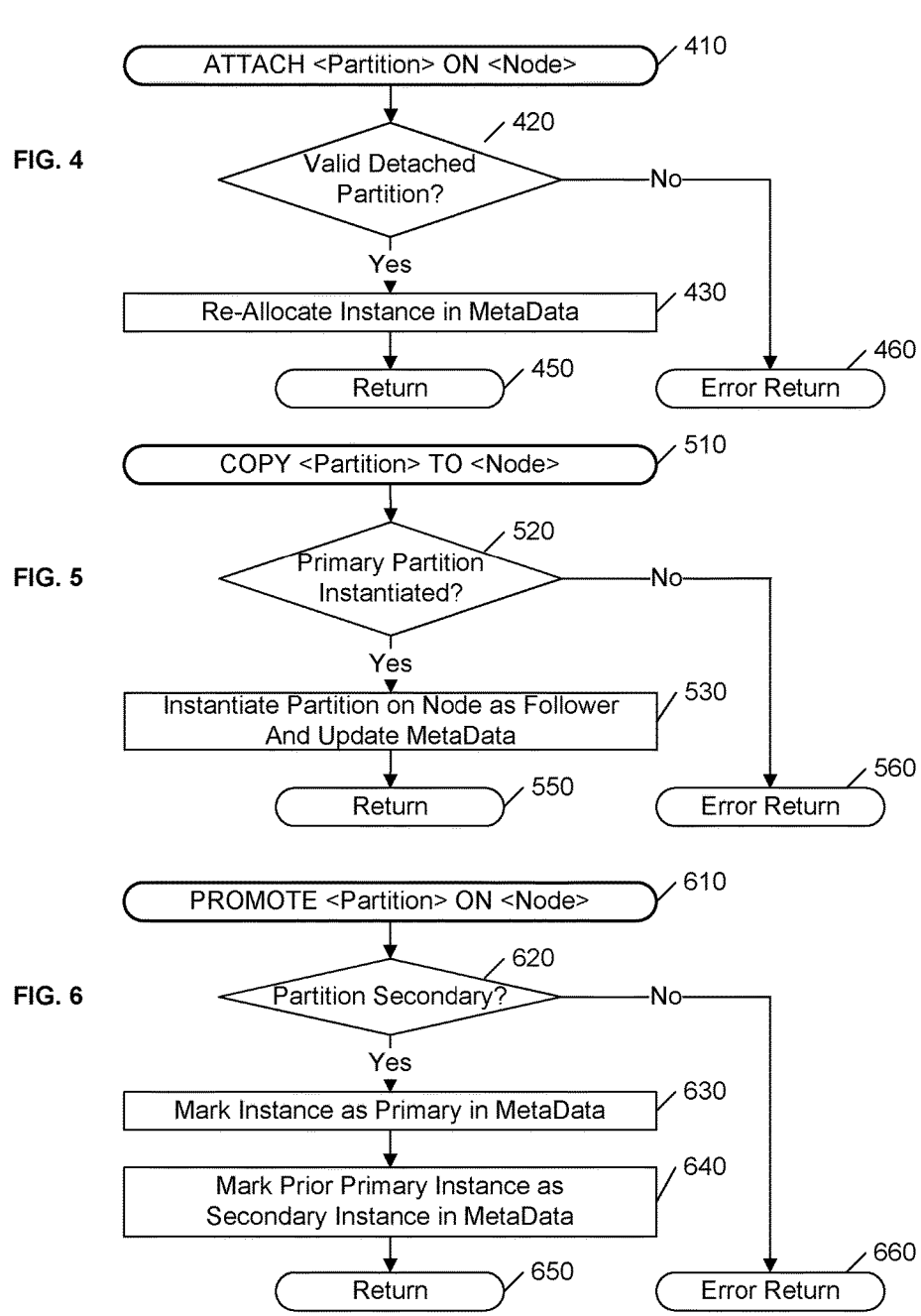

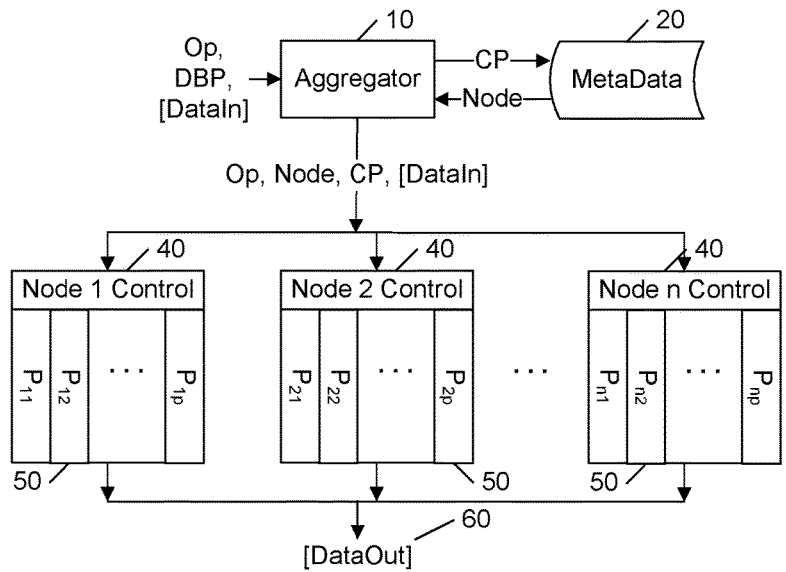
FIG. 10 [Prior Art]
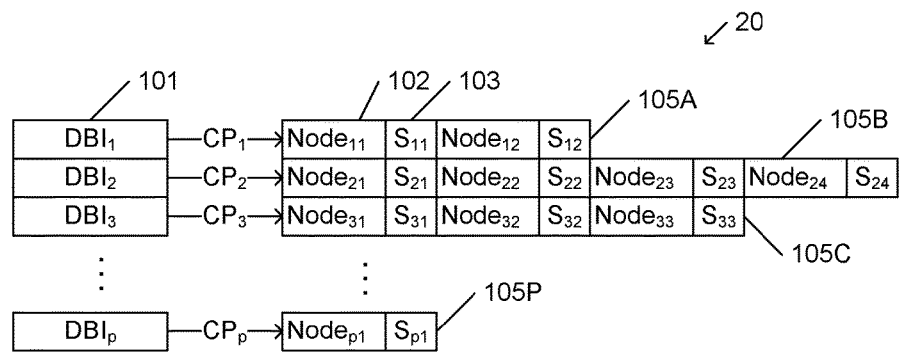
FIG. 11

ATOMIC CLUSTERING OPERATIONS FOR MANAGING A PARTITIONED CLUSTER ONLINE

This application claims the benefit of U.S. Provisional Patent Application 62/233,825, filed 28 Sep. 2015.

BACKGROUND AND SUMMARY OF THE INVENTION

This invention relates to the field of database management, and in particular to a system and method for managing a cluster of nodes that contain partitions of data based on the use of six atomic online clustering operations.

The ever increasing use of electronic commerce, information access, and other applications that access large sets of data has increased the demand for high reliability and accessibility to the data. The loss of access to data for even a few minutes could cost a large e-commerce provider hundreds of thousands of dollars in lost sales as purchasers choose other vendors during the outage. In like manner, slow access to data will likely cause purchasers to choose other vendor sites for better performance.

Techniques such as load sharing, redundancy, and others have been developed to assure high performance and high reliability. Clusters of servers may be provided to enable multiple users to access the database at the same time with minimal latency; and such servers can be configured to automatically absorb the load of servers that fail. In like manner, clusters of data nodes may be provided to assure distributed access to the database, wherein such data nodes are also configured to provide redundant/back-up access when individual nodes fail, or are taken offline for repair or updating.

FIG. 10 illustrates an example database management system that uses a cluster of nodes to provide high availability and elasticity. The following is a description of the operation of such a database management system in very general terms, to provide a background to the structure of an example system to which this invention applies. One of skill in the art will recognize that this invention may also apply to alternative structures and/or principles of operation.

In a conventional embodiment, a 'master' database may be maintained, and downloaded to one or more clusters to support the expected demand for access to the data of the database via the clusters. Each cluster may support a different set of servers, and contain the entire database; or, each cluster may contain different portions of the database and support the entire set of servers for access to its particular subset of the data; or any combination between these extremes. Some embodiments may include a single cluster, and some embodiments may use a set of clusters to store the 'master' database. In the example embodiment of FIG. 10, the database is illustrated as being contained in a single cluster, for ease of understanding.

Conventionally, a database is partitioned into logical blocks of data, termed database partitions DBP, and the clusters that store the data in the database are similarly logically partitioned into a plurality of cluster partitions CPs, each cluster partition CP corresponding to a database partition DBP. Typically, the cluster partition is an ordinal that is incremented as each database partition DBP is assigned to the cluster.

Basic database operations include Read, Write, and Delete functions, wherein an input to the system includes an identifier of the operation Op that is to be performed, and an identifier of the database partition DBP that is being addressed by the operation Op. If the operation is a write operation, the input will also include the data [DataIn] to be written to the database partition DBP.

An aggregator 10 receives the input and determines the cluster partition CP corresponding to the database partition DBP. In some embodiments, the cluster partition CP is the same as the database partition DBP and a translation is not required.

Upon determining the cluster partition CP corresponding to the database partition DBP, the aggregator 10 determines which Node has been allocated to the partition CP containing the data block identified by the identifier DBP. When the identified DBP is assigned to the cluster, the aggregator 10 allocates a node N for storing the data of the identified cluster partition CP. The aggregator 10 maintains a set of metadata 20 that maps each cluster partition CP to its allocated node(s); each node maintains a mapping between the identified cluster partition CP and the physical location $P_{Nx}$ of the database partition within the node. If multiple aggregators 10 provide access to the cluster, each aggregator maintains the same metadata 20, typically via a synchronous replication of all changes to the metadata.

To provide data availability in the event of a failure, the aggregator 10 may allocate each partition CP to multiple nodes, with a select node being identified as containing a 'primary' copy of the partition, and all of the other nodes allocated to the partition CP being identified as containing 'follower partitions', which are replications of the partition CP. The metadata at each cluster includes these multiple allocations, as illustrated in FIG. 11 and detailed further below.

During a Read operation, the data of the partition CP is obtained from the primary node and provided as the DataOut 60 from the cluster; if the primary node is not available, the data of the partition CP is obtained from a select follower node.

During a Write operation, the data block DataIn is written to the partition on the primary node (hereinafter "primary partition") allocated to the CP. The content of the primary partition is replicated to each corresponding partition of the secondary nodes (hereinafter "secondary partition"). Depending upon the particular embodiment, the primary nodes may be configured to autonomously "push" the data from the primary partition to each secondary partition; or, the secondary nodes may be configured to autonomously "pull" the data from the primary partition. Alternatively, the aggregator may be configured to maintain the time that each partition associated with each CP was last changed, and prior to using the data on a secondary partition of the CP, these times may be checked to assure that the primary partition has not been updated since the secondary partition had been updated.

As detailed further below, in addition to providing read and write access to the data blocks in the cluster, the aggregator 10 has the responsibility for maintaining the metadata 20 to efficiently manage the allocation of nodes 40 to assure high availability and elasticity (expand, contract, balance loads, and so on). High availability and elasticity are key features for database management systems that use clustered data nodes. Solving each problem requires the ability to move data around a cluster, keep online and up-to-date backups (via replication, described above), and adjust the topology of the cluster in response to events like adding new nodes to the system or nodes failing. Of particular note, three commonly implemented clustered database procedures provided by the aggregator 10 include data failover, auto healing, and elastic scaling.

Data failover is the process of keeping a database system online in the event of a node failure. When a node fails, the data that it was responsible for serving must be exposed by other nodes in the system. To do so in an online manner, the system must maintain hot backups (replicas) of the data in the steady state that are available for use should their source (e.g. the node containing the 'primary' copy of the partition data) fail.

When a node recovers, it must be reintroduced into the system. This means reusing whatever data is on the node (if it is still valid), and optionally balancing data among the nodes so that the data in the cluster is evenly distributed. Advanced database systems are able to do this automatically when a node is visible to the cluster. The process of reintroducing a node automatically is called auto-healing.

Elastic scaling is the process of redistributing data in a cluster as it scales up or down, including load balancing. This is a common operation for cloud-based systems where hardware can be easily acquired to horizontally scale a cluster.

Currently, embodiments of these features are provided in an 'ad hoc' manner, wherein modules for providing data failover, auto-healing, elastic scaling, and others are custom designed for the particular database embodiment, or the particular database management system. This custom design introduces significant costs to create, test, and support each embodiment, with the accompanying risk of poor or unreliable performance.

It would be advantageous to provide a core group of primitives that can be used to create higher level clustered database features and functions, including data failover, auto-healing, and elastic scaling. It would also be advantageous to minimize the number of primitives in this group, and to optimize the features of each primitive to enable embodiments of the higher level features using a minimum number of these primitives. It would also be advantageous to enable these primitives to operate 'online', with minimal interference with users of the database, and to operate in parallel, for optimized performance.

These advantages, and others, can be realized by providing a set of six atomic primitives that are able to be used in combination to provide all of the common features and functions of a clustered database, including data failover, auto-healing, and elastic scaling. These six atomic primitives include CREATE, DROP, DETACH, ATTACH, COPY, and PROMOTE. Of particular note, it is shown that by maintaining appropriate metadata, including the status of each instance of each partition in the cluster, the versatility and reliability of this set of primitives is sufficient to implement each of the aforementioned data failover, auto-healing, and elastic scaling features and functions with high efficiency using a minimal number of these primitives. Each primitive is atomic (such that the cluster is clearly in one state or another) and online (a workload of reads and writes is uninterrupted while the primitive runs), and each primitive is scoped to a single partition of data, thereby enabling parallel processing.

BRIEF DESCRIPTION OF THE DRAWINGS

The invention is explained in further detail, and by way of example, with reference to the accompanying drawings wherein:

FIGS. 1-6 illustrate example embodiments of each of the primitive CREATE, DROP, DETACH, ATTACH, COPY, and PROMOTE operations, respectively.

FIG. 10 illustrates an example embodiment of a prior art clustered database management system to which embodiments of this invention may be applied.

FIG. 11 illustrates an example data structure for representing a cluster's metadata.

Throughout the drawings, the same reference numerals indicate similar or corresponding features or functions. The drawings are included for illustrative purposes and are not intended to limit the scope of the invention.

DETAILED DESCRIPTION

Figure 1:
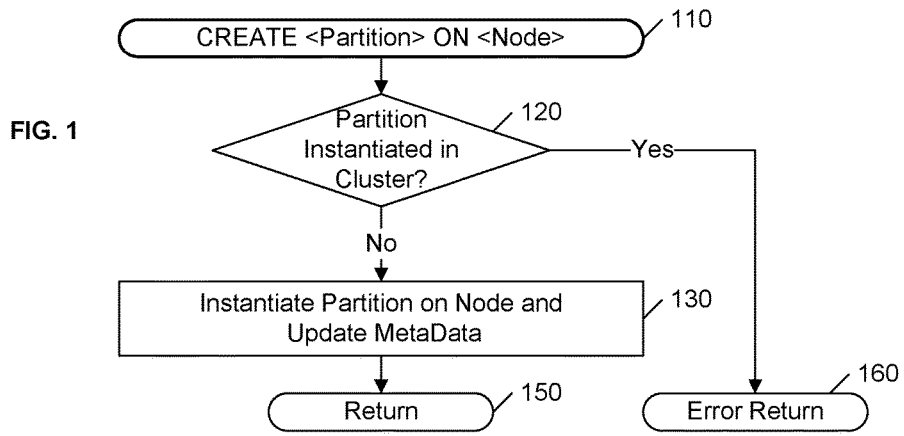

In the following description, for purposes of explanation rather than limitation, specific details are set forth such as the particular architecture, interfaces, techniques, etc., in order to provide a thorough understanding of the concepts of the invention. However, it will be apparent to those skilled in the art that the present invention may be practiced in other embodiments, which depart from these specific details. In like manner, the text of this description is directed to the example embodiments as illustrated in the Figures, and is not intended to limit the claimed invention beyond the limits expressly included in the claims. For purposes of simplicity and clarity, detailed descriptions of well-known devices, circuits, and methods are omitted so as not to obscure the description of the present invention with unnecessary detail.

This application addresses the management of the nodes within a cluster of nodes, specifically, but not limited to the ability to move data allocations around the cluster, keep online and up-to-date backups, and adjust the topology of the cluster in response to events such as adding new nodes to the system or responding to the failure of a node. Of particular note, this application does not directly address the storage and retrieval of the actual data. The inventors have recognized that a segregation of allocation functions and data specific functions enables the use of highly efficient storage allocation and management primitive operations that have minimal effect on the data specific functions. This allows for the implementation of higher level functions, such as compensating for a node failure, re-attachment of a recovered node, load balancing, and so on, that can be implemented with minimal impact on the data-specific workload (sequences of Reads and Writes).

The primitive operations of this invention manage the allocation and backup functions of the cluster primarily through the use of metadata. Metadata includes information related to the cluster, as distinguished from the 'actual' data of the supported database; in the context of this invention, the metadata includes an identification of each database partition DBP that is currently allocated to each cluster partition CP, an identification of the nodes that are configured to contain a replication of the data in the cluster partition CP, and one or more status indicators associated with each identified node.

FIG. 11 illustrates an example configuration of at least a portion of the metadata that may be associated with each cluster. One of skill in the art will recognize that other configurations would be suitable for use in this invention.

In this example embodiment, the database management system determines which cluster partitions will be responsible for which blocks of data in the database. Such a system may send an Assign (DBP TO Cluster) command, which causes the addressed Cluster to assign a cluster partition CP to this database partition DBP. These assignments may occur when the database in initially brought on line, or may occur as each database partition is added to the database. If there is only one cluster associated with the database, the "Cluster" argument may be omitted, and the cluster may automatically assign all of the database partitions upon initialization, without specific assign instructions from the database management system.

The assigned DBPs are stored in a list 101, indexed by the Cluster Partition CP identifier, which may merely be an ordinal that is incremented with each assignment. As noted above, in some embodiments, the CP may be defined to be identical to the DBP, obviating the need to explicitly store the DBPs. Each assigned cluster partition CP will be allocated to one or more nodes, and a list 105A, 105B, etc. of the Nodes 102 allocated to store the data of the cluster partition CP is maintained by the aggregator 10 as the metadata associated with this DBP (equivalently, associated with the corresponding CP). A status indicator S 103, detailed further below, may also be associated with the metadata of each of the allocated nodes.

In the example embodiment of FIG. 11, two nodes ($N_{11}$, $N_{12}$) have been allocated to $CP_1$ to store the data of $DBP_1$; four nodes ($N_{21}$, $N_{22}$, $N_{23}$, $N_{24}$) have been allocated to $CP_2$ to store the data of $DBP_2$; three nodes ($N_{31}$, $N_{32}$, $N_{33}$) have been allocated to $CP_3$ to store the data of $DBP_3$; one node ($N_{p1}$) has been allocated to $CP_p$ to store the data of $DBP_p$; and so on. Note that subscript only refers to the location of the node identifier in the structure of the metadata; the same node identifier may appear in multiple locations. The use of this metadata information and structure will be apparent in the subsequent descriptions of the primitive operations.

As noted above, this disclosure presents six primitive operations, CREATE, DROP, DETACH, ATTACH, COPY, and PROMOTE upon which the common higher level clustered database management functions can be based. Each of these primitive operations is designed to be atomic, such that, from an external view, the metadata is always in a defined state (i.e. not transitory); online, such that workflows of read and write operations are not interrupted while the primitive is executing; and scoped to a single partition, to enable parallel operation of each primitive.

The CREATE <CP> ON <Node> primitive 'instantiates' the database partition DBP associated with the cluster partition identifier CP on the Node, and is typically executed when the cluster receives an 'Assign (BDP TO Cluster)' command from the database management system. In response to the assignment, the aggregator assigns the identified Node with the responsibility for storing a copy of the data of the particular database partition DBP, which is identified as CP within the cluster. To distinguish between the storage of a copy of the actual data, and the responsibility for storing the data, the term "instance" of a partition CP on a Node is used to identify the allocated space for storing the partition CP on the Node.

When the CP is instantiated on the Node via the CREATE <CP> ON <Node> primitive, the allocated space on the node is 'empty'. A subsequent conventional 'Write <DBP> ON <Cluster>' command from the database management system will move the actual data to the Cluster, and the Cluster will transfer the data to the assigned Node. Alternatively, upon receipt of a 'Write <DBP> ON <Cluster>' command, the Cluster will determine whether this DBP has been assigned to the Cluster; and if not, will add the partition DBP to its list of assigned partitions (101 of FIG. 11), select a Node, and execute the CREATE <CP> ON <Node> primitive before transferring the DBP data to the Node.

As noted above, this separation of the memory management functions from the data transfer functions in each of the primitives provides for independent operations, thereby enabling efficient primitives that are atomic and online.

FIG. 1 illustrates an example flow diagram of an embodiment of the CREATE <Partition> ON <Node> primitive operation, which starts at 110. If, at 120, the identified database partition DBP is already instantiated on the cluster, as identified in the list 101 of DBPs in the cluster's metadata, an error is returned, at 160, because the CREATE primitive is defined to be the operation that initiates the assignment of the DBP to the cluster. Handling this error will be dependent upon the particular embodiment. In most embodiments, an error return will generally be handled by notifying the originator of the 'Assign (DBP TO Cluster)' that this DBP has already been assigned to the cluster.

If, at 120, the identified database partition DBP is not yet instantiated on the cluster, the process continues to 130, wherein the cluster adds the DBP to the list 101 of DBPs assigned to the cluster, and identifies this addition as CP. The assigned Node allocates memory to store the data associated with partition CP, thereby instantiating partition CP on the Node. This instance of CP on the Node is recorded in the cluster's metadata by initiating a list 105 of nodes associated with this CP (DBP) with the identifier of the assigned Node. In embodiments that assume that the first instance in the list 105 is the primary instance, no further action is required; in alternative embodiments, the status S 103 of this instance is updated to indicate that this instance is the primary for this partition CP. The operation concludes at 150.

The DROP <CP> ON <Node> primitive 'removes' the instance of the partition CP from the Node by notifying the Node that it is no longer responsible for maintaining storage for this partition CP, and removing the Node from the list 105 of nodes that identifies the nodes upon which the CP has been instantiated. Because the instance of CP on the Node is terminated, the data in the previously instantiated partition is considered to be deleted, allowing a new partition CP to be instantiated on this Node, via a subsequent CREATE <CP> ON <Node> operation, detailed above.

Figure 2:
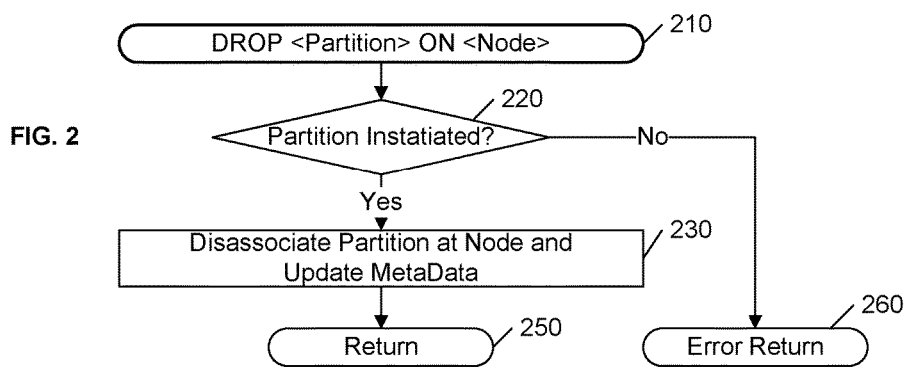

FIG. 2 illustrates an example flow diagram of an embodiment of the DROP <Partition> ON <Node> primitive operation, which starts at 210. At 220, the process determines whether the identified Partition is instantiated on the Node, by determining whether the Node appears in the list 105 of nodes associated with this Partition in the metadata. If the Partition is instantiated on the Node, this instance is deleted by notifying the Node that it is no longer responsible for maintaining this Partition in memory, and updating the list 105 of nodes in the metadata associated with this Partition by removing this Node from the list. The operation concludes at 250.

If, at 220, it is determined that the Partition is not currently instantiated on the Node, an error is returned, at 260. Handling this error is dependent upon the particular embodiment; but in most cases, the consequence of the error is negligible, because in either event, the partition is no longer associated with a DBP.

The DETACH <CP> ON <Node> primitive is similar to the DROP <CP> ON <Node>, above, in that it effectively removes the Node from the list of nodes upon which CP has been instantiated. In an embodiment of this invention, the status field (S 103 in FIG. 11) associated with this particular instance of CP on the Node 102 in the metadata is updated to indicate that this instance on the Node is 'detached'. In subsequent Reads and Writes, the aggregator will ignore any instances that are detached; in the management of nodes, the aggregator will still consider the node to have an instance on the Node, albeit detached.

A detached instance of a partition CP is typically the result of a failed Node. Rather than deleting the instance at the Node, as in the DROP operation, the instance of the partition CP on the failed Node is maintained, so that if the failed Node is recovered, the detached instance of the partition CP on this Node may be re-attached as a valid instance of CP on this Node, without having to restore the data in the partition on the Node (see ATTACH, below).

Figure 3:
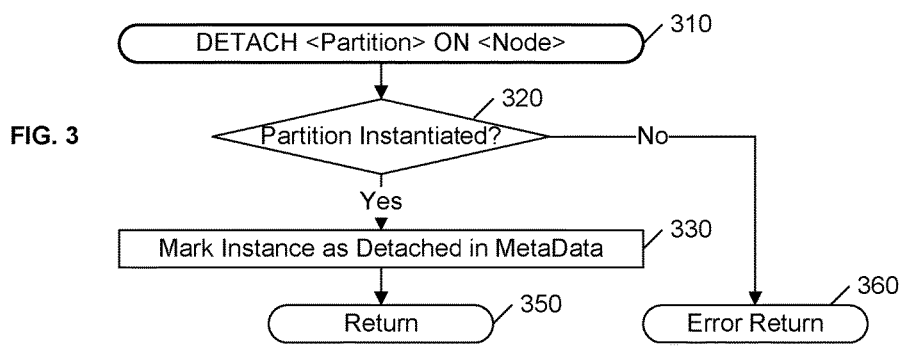

FIG. 3 illustrates an example flow diagram of an embodiment of the DETACH <Partition> ON <Node> primitive operation, which starts at 310. At 320, it is determined whether the Node contains the instantiated partition CP. If it is, the status S 103 in the metadata of the instance is changed to "detached", at 330, and the operation concludes, at 350. Note that the DETACH primitive only affects the metadata; no action is taken at the Node. As noted above, an instance becomes detached when a node fails, and attempting to taking action at the Node will likely be unsuccessful.

Optionally, if the detached instance on the Node was a primary instance, the DETACH primitive may include changing the status of the instance to follower, and selecting a follower primitive to be the new primary (see "PROMOTE <CP> ON <Node>", below).

If, at 320, it is determined that the partition CP has not been instantiated on the Node, an error is returned, at 360. In a typical embodiment, this is an insignificant error, because the purpose of the DETACH and ATTACH operations is to enable re-attachment of valid instance without modifying the data within the instance, and if the partition CP is not instantiated on the NODE, it will not be re-attached.

The ATTACH <CP> ON <Node> primitive operation re-establishes the instantiation of a detached instance of partition CP on the Node without affecting the data within the instance of the partition, assuming that the data within the detached instance is still valid.

The data in a detached instance of partition CP on the Node will be valid provided that a change (e.g. Write operation) has not occurred on the associated data block at the DBA while this instance of partition CP on the Node was detached. If the detached partition had been a primary partition, and a Write operation was attempted, an error would be returned until a secondary partition is promoted. Accordingly, a detached primary partition will be valid if a new primary partition has not yet been allocated to this partition CP, and will be invalid if a new primary partition has not yet been allocated.

A secondary partition will be valid if the time of its last replication/update is after the time of the last write to the primary partition, and invalid otherwise. The time of last write or replication to each partition may be included in the metadata of the cluster partition CP.

FIG. 4 illustrates an example flow diagram of an embodiment of the ATTACH <Partition> ON <Node> primitive operation, which starts at 410. At 420, it is determined whether a valid instance of the Partition on the Node is identified as a detached instance. If the valid detached Partition is on the Node, it is re-allocated to the Node as an instantiated partition. Using the example data structure of FIG. 11, this can be accomplished by removing the 'detached' status of the Partition on the Node, at 430. The primitive operation is concluded, at 450.

If, at 420, the Partition is not a valid detached partition, the operation may conclude with an error notice, at 460. Alternatively, corrective action could be performed, and a corrected partition could be reallocated to the partition CP. For example, if the partition is invalid because it is a primary partition and another primary has been created, it may be reattached to the CP by executing a DROP <Partition> ON <Node> followed by a COPY <Partition> ON <Node>, which reattaches the partition as a secondary partition that includes a replication of the new primary partition. In like manner, if the partition is a secondary partition which was updated prior to the last update of the primary partition, a replication of the data in the primary partition could be effected, and this updated follower partition may be reattached to the partition CP. One of skill in the art will recognize that the aforementioned replications may include incremental updates, if the state of the primary partition includes a list of changes made at each prior write operation.

The COPY <CP> ON <Node> primitive operation creates a 'follower' instance of the partition CP. As noted above, the cluster provides high data availability by maintaining multiple instances of its assigned database partitions DBPs (CPs), each instance of a partition being located on a different node. Preferably, one instance of each partition CP is identified as the 'primary' instance, and all other instances of the partition CP are identified as 'follower' instances. Typically, for example, the first instance of the partition CP on a Node via the CREATE <CP> ON <Node> operation is defined as the 'primary' instance, and all of the other instances are instantiated as 'follower' instances via the COPY <CP> ON <Node> operation.

The identification of whether an instance is a primary instance or a follower instance may be included in the status S 103 field in the metadata. Other means of distinguishing primary and follower partitions is to define the first instance in each list 105 as the primary; if a different instance is defined to be the primary instance, the order of the list 105 is changed to place this instance in the first position in the list 105.

The COPY <CP> ON <Node> operation is similar to the CREATE <CP> ON <Node>, except that the CREATE <CP> ON <Node> operation assumes that no other instances of the partition CP in the cluster, whereas the COPY <CP> ON <Node> operation assumes that there is at least one instance of the partition CP (e.g. the primary instance) in the cluster.

FIG. 5 illustrates an example flow diagram of an embodiment of the COPY <Partition> TO <Node> operation, which begins at 510. At 520, it is determined whether a primary instance of the Partition exists on the culture. If so, the Partition is instantiated on the Node, at 530, by informing the Node that it is responsible for storing the Partition, and by adding the Node to the list 105 of instantiated partitions of this Partition in the metadata of FIG. 11. The operation concludes, at 550. Not illustrated in FIG. 5, the addition of the Node to the list 105 also enables the autonomous replication of the content of the primary partition to the allocated partition on this Node.

If, at 520, it is determined that a primary instance of the Partition in the cluster does not exist, and error is returned, at 560. In response to such an error return, the aggregator may issue a CREATE <Partition> ON <Node> to provide a primary instantiation of the Partition on the Node.

The PROMOTE <CP> ON <Node> primitive operation identifies the instance of the partition CP on the Node as the primary instance, and identifies the prior primary instance as a follower instance.

FIG. 6 illustrates an example flow diagram of an embodiment of the PROMOTE <Partition> ON <Node> primitive operation, which beings at 610. At 620, it is determined whether the identified Partition on the Node is a follower instance. If it is a follower instance, it is identified as a primary instance, for example, by changing its status S 103 in the metadata from 'follower' to 'primary', or reordering the list 105 of instances to place this instance of partition CP on the Node as the first entry in the list 105, depending upon how the distinction between primary and follower instances is maintained in the metadata. Not illustrated in FIG. 6, this change to the list 105 terminates the autonomous replication of the content of the prior primary partition and enables the autonomous replication of the content of this new primary partition to each of the secondary partitions.

At 630, the prior primary instance is identified to be a follower instance, for example, by changing its status S 103 to 'follower'. If an instance's location in the list 105 defines which instance is the primary instance, the changing of the prior primary to be a follower instance will occur automatically when the promoted follower takes the place of the prior primary in the list 105.

It is significant to note that each of the above described primitive operations require minimal actions to be performed, including, for the ATTACH, DETACH, and PROMOTE operations, merely modifying the cluster's metadata without affecting the nodes that store the database partitions DBP (CP). Even the primitive operations that interact with the nodes, CREATE, DROP, and COPY, only require the nodes to allocate or deallocate storage, which will likely be performed by merely modifying metadata on the nodes. Accordingly, each of these operations can be configured to be non-interruptible (i.e. 'atomic') without having a noticeable impact on the performance of workloads of Reads and Writes of the database data (i.e. 'online'). Additionally, because each execution of these primitive affects only a single partition, there is minimal, if any, dependence between each execution, thereby allowing multiple concurrent executions in most, if not all, applications (i.e. inherent 'parallelism'). Finally, because each cluster may operate independent of any other clusters that are supporting the database, and because the allocation of database partitions DBPs among the clusters, and consequently among the nodes of the clusters, growing or shrinking the size of the database is a relatively simple task (i.e. inherent 'extensibility').

Figure 7:
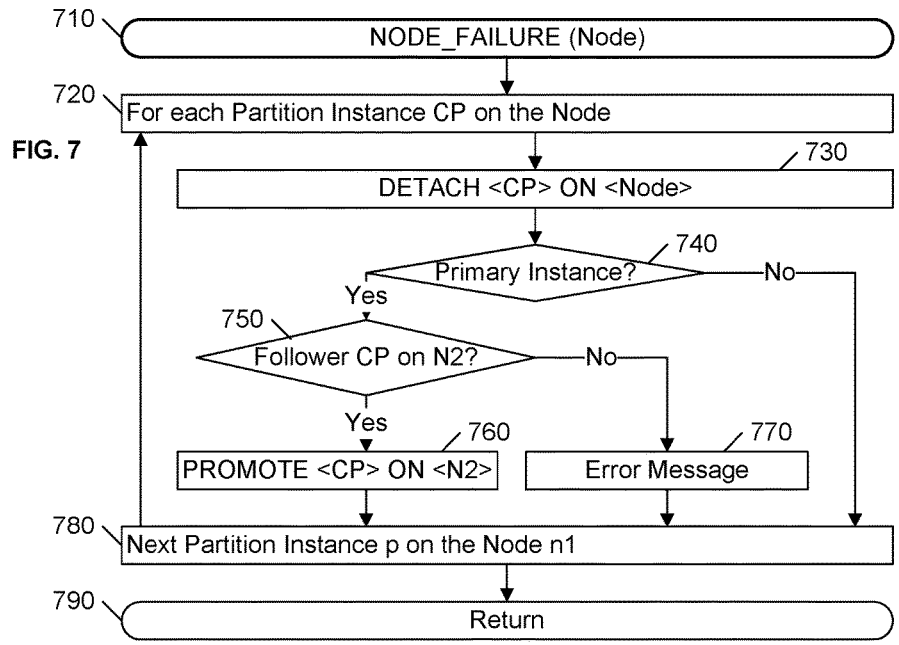
FIGS. 7-9 illustrate example embodiments of each of the higher level functions of NODE_FAILURE, AUTO_HEAL, and REBALANCE, respectively, using the aforementioned primitive operations.
Figure 8:
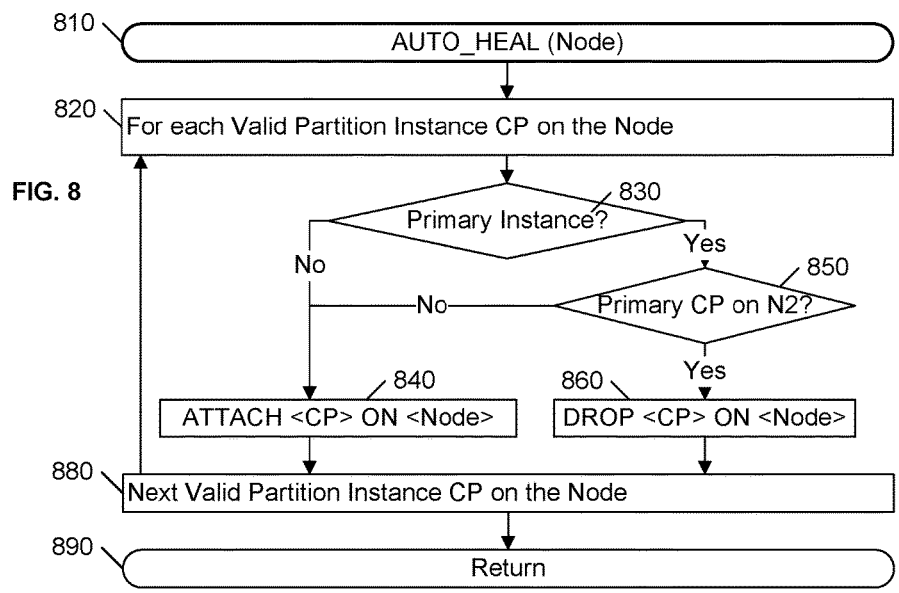
Figure 9:
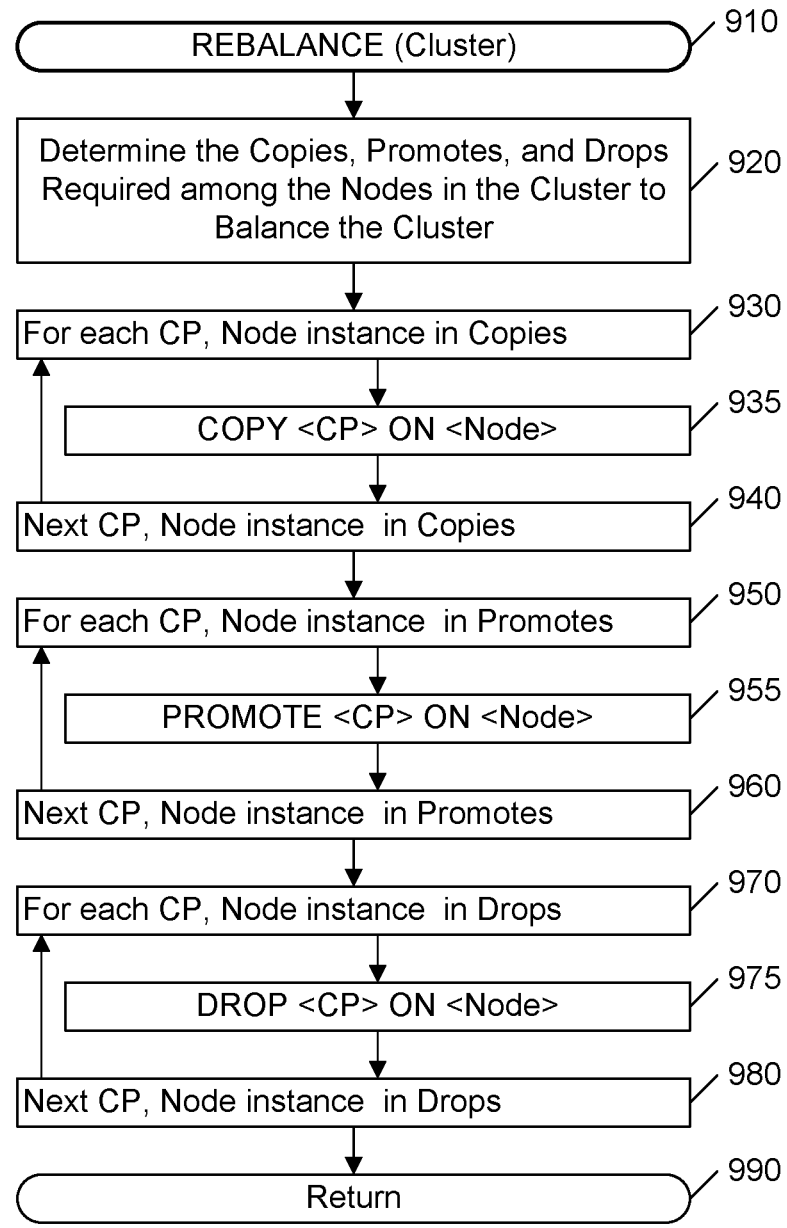

To demonstrate that these six primitive operations provide a substantial range of capabilities for effective and efficient database management in a 'clustered nodes' embodiment, FIGS. 7-9 illustrate example embodiments of each of the higher level functions of NODE_FAILURE, AUTO_HEAL, and REBALANCE, respectively, using these primitive operations.

FIG. 7 illustrates an example flow diagram of an embodiment of the NODE_FAILURE (Node) function, which is typically executed when a Node fails, or when a Node is purposely taken 'off line' for maintenance or other purposes. Node failures may be detected when the Node fails to respond to a periodic 'status check' prompt from the cluster, or other means of detecting a lack of communication with the Node, or significant degradation of service from the Node. For ease of reference, when a Node is no longer communicating with the cluster, whether intentionally or not, the Node is considered to be in the "Failed" state.

When a Node fails, the cluster must assure that no operations are performed that rely on petition instances on the failed nodes. That is, it must record the fact that the node is no longer available, and prevent operations, such as Reads and Writes, to the failed node. In an embodiment of this invention, the fact that a node has failed is recorded by marking each instance of each partition on the failed node as being 'detached'. Thereafter, as detailed above, the aggregator will not attempt to access these detached partitions.

With regard to FIG. 7, upon detection of a Node failure, the aggregator executes the NODE_FAILURE (Node) function, at 710. The aggregator then executes the loop 720-780 for each of the partition instances CP on the Node. These instances are identified in the lists 105 of each CP (DBP). In an embodiment of this function, each entry 102 in the list 105 for each CP is assessed to determine if the node of the instance is the failed Node. Alternatively, a list of assigned partitions CP may be maintained for each node; when a partition is assigned to a node (e.g. via CREATE or COPY), the identified partition CP is added to the list of partitions for this node. In such an embodiment, the loop 720-780 is processed by merely stepping through the list of partitions CP associated with the failed Node.

For each instance CP on the failed Node, the instance of partition CP is marked as 'detached' in the status S 103 of the metadata for this instance via the DETACH <CP> ON <Node> primitive, at 730.

After each partition instance CP on the failed Node is detached, the process determines whether the detached instance CP on the failed node was a primary instance, at 740. If not, the next instance on the failed node is processed, via 780.

If the primary instance has been detached, a new primary instance is identified, assuming that one or more follower instances of partition CP exists, as determined in the list 105 for this CP, and one of those instances (e.g. on N2) is selected, at 750, to be promoted to primary via the PROMOTE <CP> ON <N2> primitive, at 760. If no follower instances of CP exist, an error message is returned, at 770, for this CP. In response to this error message, if a valid copy of the DBP exists, such as in cache memory, the database management system may re-create the CP and execute a Write operation. Otherwise, for read operations, it must wait for the node to be reattached. Conventionally, the aggregator 10 always assures that there are sufficient follower nodes assigned to each CP to prevent this situation.

The NODE_FAILURE function concludes at 790. As detailed above, all of the instances on a failed node are identified as being detached by merely modifying the metadata in most cases (i.e. absent having to create an instance, at 770), thereby providing for a rapid and efficient method for reacting to a node failure. One of skill in the art will recognize that there is no need to sequentially process each instance on the failed node, and that multiple instances may be processed in parallel.

The AUTO_HEAL (Node) function is executed when a failed Node is recovered. As noted above, each node will likely contain a substantial amount of data, and avoiding the rewriting of this data to a recovered Node substantially improves the response time for getting the recovered Node back on line. Accordingly, the AUTO_HEAL function attempts to re-attach as many instances on the recovered Node as possible. Additionally, the AUTO_HEAL function attempts to assure that the reattachment of an instance does not result in a conflict regarding which instance is the primary instance.

FIG. 8 illustrates an example flow diagram of an embodiment of the AUTO_HEAL (Node) function, which starts at 810. The loop 820-880 is executed for each valid instantiation of partitions CP on the recovered Node. As with the loop 720-780, the instances CP are identified by assessing each of the lists 105 of instances associated with each CP for a node identifier 102 that matches the recovered Node, or, by maintaining a list of all of the instances CP assigned to the Node, and stepping through that list.

As detailed above, the DETACH primitive may optionally include changing the status of a detached primary instance to a detached follower instance and identifying a new primitive instance. If so, the decision block at 830 is not necessary, and the process proceeds to reattach the instance CP on the restored Node, via the ATTACH <CP> ON <Node> primitive, at 840. In like manner, if the ATTACH <CP> ON <Node> primitive includes a check to assure that a primary partition is not instantiated as a primary if a new primary has been created, as detailed above, the blocks 850-860 may be deleted.

If the primary/follower status of the instance is not modified in the DETACH primitive, the process determines whether the detached partition instance CP had been a primary instance when the Node failed, at 830. If the instance CP on the detached Node was a primary instance, the process determines whether another instance of CP in the cluster (e.g. and instance CP on a node N2, as identified by the entries in the list 105 for this CP) has been promoted to be a primary instance, at 830. If another primary instance of CP in the cluster is not found, the primary instance on the restored Node is re-attached, via the ATTACH <CP> ON <Node> primitive, at 840.

As with the NODE_FAILURE function, the AUTO_HEAL function in most cases affects only the cluster's metadata, via the ATTACH primitive, and thus can be executed quickly, with minimal impact on the workloads of Reads and Writes operating on the data within the cluster. And, as with the NODE_FAILURE function, because the scope of the ATTACH primitive is limited to a single instance, the operations within the AUTO_HEAL function can be executed in parallel When some or all of a database is allocated to a cluster, an a priori assessment of the expected load on the cluster may be used to determine how the instances are distributed among the nodes so as to avoid 'bottle-necks' caused by nodes that are accessed substantially more often than the other nodes. Alternatively, an ad-hoc approach may be taken wherein each cluster merely allocates instances among nodes as the need arises. These initial load distributions may not prove to be efficient for dealing with the workload experienced by the cluster. In like manner, as additional nodes are added to or deleted from the cluster, the load may need to be re-distributed among the remaining nodes in the cluster.

Load balancing algorithms based on prior performance with a current allocation are well known in the art. These algorithms typically define a cluster configuration that will optimize the allocation of tasks among the nodes of the cluster, based on the prior workloads of the cluster. This optimized allocation is compared to the current allocation and a list of changes required to create the optimized allocation from the current allocation is defined, typically using algorithms that minimize the number of changes, or the expected 'cost' of the changes based on a level of difficulty associated with each change. The list of changes may be provided in any format, but, in general terms, the list will include deletions of instances (drops), and additions of instances, both primary and follower (promotions and copies). Because the rebalancing is a modification of the current allocation based on prior workloads, the rebalancing will not create an instance for a partition that has not yet been assigned to the cluster; that is, the rebalancing will not generally include a 'creation' of an instance of a new database partition DBP (CP) on the cluster.

FIG. 9 illustrates an example flow diagram of an embodiment of the REBALANCE (Cluster) function, which begins at 910. At 920, a rebalancing algorithm is executed to identify the new instances that are required ("Copies"), the follower instances that should be primary instances ("Promotions"), and the instances that should be deleted ("Drops"). Each of the entries in the list includes an identification of the partition CP that is to be instantiated, promoted, or dropped on the corresponding Node. Of particular note, this analysis to define a rebalanced allocation within the cluster can be performed 'off line', and will have minimal, if any, impact on the performance of the workloads of Reads and Writes on the cluster while the analysis is being performed.

The loop 930-940 is executed to create the new instances (CP, Node) identified in the list of "Copies". The COPY <CP> ON <Node> primitive, at 935, creates a new follower instance of CP on the Node, and the next instance (CP, Node) in the Copies list is processed, at 940.

The loop 950-960 is similarly executed to promote all of the follower instances of partition CP on the corresponding Node (CP, Node) that are identified as being primary instances in the Promotes list, via the PROMOTE <CP> ON <Node> primitive, at 955. Existing primary instances of the partitions CP are modified to be follower instances in the execution of the PROMOTE operation. It is significant to note that the rebalance algorithm may identify instances (CP, Node) that are to be primary instances by including these nodes (CP, Node) in both the Copies list and the Promotes list; accordingly, the processing of the Promotes list should occur after the processing of the Copies list.

In like manner, the loop 970-980 is executed to delete all of the instances (CP, Node) in the Drops list, via the DROP <CP> ON <Node> primitive, at 975.

To conserve the allocation of space within the cluster during a Rebalance, the Drops list may be partitioned into two drop lists: a first Drops list that includes Drops of instances of CPs that are not included as CPs in the list of Copies, and a second Drops list that includes Drops of instances of CPs that are included as CPs in the list of Copies. The first Drops list may be executed before the execution of the loop 930-940 for the Copies, thereby releasing storage before allocating storage for the new Copies. The second Drops list is executed via loop 950-960 only after the Copies list is executed, because the second Drops list may include the only instance of a partition CP, and a deletion of such an instance would preclude being able to Copy that partition as a follower instance.

Alternatively, assuming that a primary instance exists for all partitions CP, the first Drops list that is executed before the Copies list may include all follower instances that are to be dropped, and the second Drops list that is executed after the Copies list may include all primary instances that are to be dropped.

As contrast to the NODE_FAILURE and AUTO_HEAL functions, which primarily operate on the cluster's metadata, the REBALANCE function uses primitives (COPY and DROP) that operate on the nodes as well as the metadata. However, because the primitives of this invention are independent of the data operations, even when they affect the nodes directly, the process is very efficient, because only the metadata at the node (which identifies how the partitions are allocated to the physical memory of the node) is changed by the COPY and DROP primitives. Accordingly, the REBALANCE function will also be able to be executed quickly and efficiently, with minimal impact on the workloads of Reads and Writes being process by the cluster.

The foregoing merely illustrates the principles of the invention. It will thus be appreciated that those skilled in the art will be able to devise various arrangements which, although not explicitly described or shown herein, embody the principles of the invention and are thus within its spirit and scope.

For example, one of skill in the art will recognize that the functions CREATE and COPY differ only with respect to whether a primary instance is being instantiated or a follower instance is being instantiated, and could be embodied as a single primitive, such as INSTANTIATE <CP> ON <Node>. This primitive could check whether a primary instance already exists for this CP; if so, the instance will be identified as a follower instance; otherwise it will be identified as a primary instance. In the context of this invention, such a primitive would be considered to embody both the CREATE primitive and the COPY primitive, because the only difference is where the decision between primary and follower is made. In the example INSTANTIATE primitive operation, the decision is made within the primitive; in the CREATE and COPY primitive operations, the decision is made in order to select the appropriate primitive to be executed.

In like manner, in some embodiments, the rebalance function at 920 in the REBALANCE (Cluster) function may be performed before the REBALANCE function is executed. In such and embodiment, the set of changes would be included as an argument of the function, e.g. REBALANCE (Cluster, Changes).

It is also significant to note that the addition of functions within the primitives does not eliminate the presence of the primitive in the embodiment. For example, even though the preferred embodiment of this invention isolates the data management functions from the functions that read or write data from and to the instances, to achieve at least some of the advantages detailed above, the addition of a function related to the data associated with the instances does not remove the presence of the primitive in the embodiment.

[* Any other caveats and/or alternative embodiments??? *]

These and other system configuration and optimization features will be evident to one of ordinary skill in the art in view of this disclosure, and are included within the scope of the following claims.

In interpreting these claims, it should be understood that:
a) the word "comprising" does not exclude the presence of other elements or acts than those listed in a given claim;
b) the word "a" or "an" preceding an element does not exclude the presence of a plurality of such elements;
c) each of the disclosed elements may be comprised of a combination of hardware portions (e.g., including discrete and integrated electronic circuitry) and software portions (e.g., computer instructions that, when executed by a processor, cause the processor to perform specific actions).
d) hardware portions may include a processor, and software portions may be stored on a non-transitory computer-readable medium, and may be configured to cause the processor to perform some or all of the functions of one or more of the disclosed elements;
e) any of the disclosed devices or portions thereof may be combined together or separated into further portions unless specifically stated otherwise;
f) no specific sequence of acts is intended to be required unless specifically indicated; and
g) the term "plurality of" an element includes two or more of the claimed element, and does not imply any particular range of number of elements; that is, a plurality of elements can be as few as two elements, and can include an immeasurable number of elements.

We claim:

1. A database management system that comprises:
a cluster of data nodes, each data node being able to store data of a plurality of partitions of one or more databases;
an aggregator that manages the cluster and maintains metadata of the cluster that maintains a list of instances of database partitions on nodes, each instance being able to store the data of the corresponding database partition;
wherein the aggregator is configured to include a set of primitives that are atomic, online, and partition specific, the set of primitives including:
CREATE <Partition> ON <Node>, which creates a new primary instance of the Partition on the Node;
DROP <Partition> ON <Node>, which removes the instance of the Partition from the Node;
DETACH <Partition> ON <Node>, which identifies the instance of the Partition on the Node as being detached from the Node, without deleting the data in the instance;
ATTACH <Partition> ON <Node>, which identifies the instance of the Partition on the Node as re-instantiated on the Node, without changing the data in the instance;
COPY <Partition> ON <Node>, which creates a new follower instance of the Partition on the Node; and
PROMOTE <Partition> ON <Node>, which identifies the instance of the Partition on the Node as a primary partition; and
wherein the database management system is configured to provide data failover, auto-recovery, and elastic scaling using only the set of primitives.

2. The system of claim 1, wherein the DETACH, ATTACH, and PROMOTE primitives process and affect only the metadata of the cluster.

3. The system of claim 1, wherein the CREATE, DROP, and COPY primitives affect only the metadata of the cluster and metadata of the nodes.

4. The system of claim 1, wherein the metadata of the cluster includes a status associated with each instance of each partition in the cluster, the status including whether the instance is detached from the cluster.

5. The system of claim 4, wherein the status includes whether data in the instance is valid.

6. The system of claim 1, wherein the new primary instance and new follower instance are instances that contain no data when created by the CREATE and COPY primitives.

7. The system of claim 1, wherein the system provides the data failover using the DETACH, PROMOTE, and CREATE primitives, and the auto-recovery using the ATTACH primitive.

8. The system of claim 1, wherein the system provides the elastic scaling via a rebalance function that uses the COPY, PROMOTE, and DROP primitives.

9. A non-transitory computer readable medium that includes a program that, when executed by a processor causes the processor to:

manage a cluster of data nodes, each data node being able to store data of a plurality of partitions of a database; and maintain metadata of the cluster that includes a list of instances of database partitions on nodes, each instance being able to store the data of the corresponding database partition;

wherein the program enables the processor to provide data failover, auto-recovery, and elastic scaling using only a set of primitives that include:

CREATE <Partition> ON <Node>, which creates a new primary instance of the Partition on the Node;

DROP <Partition> ON <Node>, which removes the instance of the Partition from the Node;

DETACH <Partition> ON <Node>, which identifies the instance of the Partition on the Node as being detached from the Node, without deleting the data in the instance;

ATTACH <Partition> ON <Node>, which identifies the instance of the Partition on the Node as re-instantiated on the Node, without changing the data in the instance;

COPY <Partition> ON <Node>, which creates a new follower instance of the Partition on the Node; and PROMOTE <Partition> ON <Node>, which identifies the instance of the Partition on the Node as a primary partition; and wherein each of these primitives are performed by modifying the metadata associated with the Partition, independent of the data stored at the Node.

10. The medium of claim 9, wherein each primitive of the set of primitives is atomic and online.

11. The medium of claim 9, wherein the DETACH, ATTACH, and PROMOTE primitives process and affect only the metadata of the cluster.

12. The medium of claim 9, wherein the CREATE, DROP, and COPY primitives affect only the metadata of the cluster and metadata of the nodes.

13. The medium of claim 9, wherein the metadata of the cluster includes a status associated with each instance of each partition in the cluster, the status including whether the instance is detached from the cluster.

14. The medium of claim 13, wherein the status includes whether data in the instance is valid.

15. The medium of claim 9, wherein the new primary instance and new follower instance are instances that contain no data when created by the CREATE and COPY primitives.

16. The medium of claim 9, wherein the program causes the processing system to provide the data failover using only the DETACH, PROMOTE, and CREATE primitives, and the auto-recovery using only the ATTACH primitive.

17. The medium of claim 9, wherein the program causes the processing system to provide the elastic scaling via a rebalance function that uses only the COPY, PROMOTE, and DROP primitives.

* * * * *